US012579201B2

(12) United States Patent
Akamine

(10) Patent No.: US 12,579,201 B2
(45) Date of Patent: Mar. 17, 2026

(54) INFORMATION PROCESSING SYSTEM

(71) Applicant: FUJIFILM Business Innovation Corp., Tokyo (JP)

(72) Inventor: Ryo Akamine, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 812 days.

(21) Appl. No.: 17/584,386

(22) Filed: Jan. 26, 2022

(65) Prior Publication Data

US 2023/0096234 A1     Mar. 30, 2023

(30) Foreign Application Priority Data

Sep. 27, 2021     (JP) ................................ 2021-157123

(51) Int. Cl.
*G06F 16/93*          (2019.01)
*G06F 16/904*         (2019.01)
*G06F 40/137*         (2020.01)

(52) U.S. Cl.
CPC ............ *G06F 16/94* (2019.01); *G06F 16/904* (2019.01); *G06F 40/137* (2020.01)

(58) Field of Classification Search
CPC ....... G06F 16/904; G06F 16/94; G06F 40/137
See application file for complete search history.

(56) References Cited

U.S. PATENT DOCUMENTS

| | | | |
|---|---|---|---|
| 8,355,955 B1 | 1/2013 | Mirchandani et al. | |
| 2015/0242893 A1* | 8/2015 | Mirchandani ...... | G06Q 30/0641 |
| | | | 705/14.53 |
| 2019/0057182 A1* | 2/2019 | Klement ................ | G06N 20/00 |
| 2021/0081294 A1* | 3/2021 | Golubev ............. | G06F 11/3089 |

FOREIGN PATENT DOCUMENTS

| | | |
|---|---|---|
| JP | 2005327145 | 11/2005 |
| JP | 2008090560 | 4/2008 |
| JP | 2011095866 | 5/2011 |
| JP | 2013101687 | 5/2013 |

OTHER PUBLICATIONS

Zeldes et al. ("ANNIS: a search tool for multi-layer annotated corpora", published Jan. 1, 2009, https://www.linguistik.hu-berlin. de/de/institut/professuren/korpuslinguistik/mitarbeiter-innen/amir/ pdf/CL2009_ANNIS_pre.pdf) (Year: 2009).*
Amir Zeldes et al., "ANNIS: a search tool for multi-layer annotated corpora," Jan. 2009, pp. 1-23, Available at: https://www.linguistik. hu-berlin.de/de/institut/professuren/korpuslinguistik/mitarbeiter-innen/amir/pdf/CL2009_ANNIS_pre.pdf.
Meng-Yen Hsieh et al., "Building a mobile movie recommendation service by user rating and APP usage with linked data on Hadoop," Multimedia Tools and Applications, Aug. 2016, pp. 3383-3401.
"Search Report of Europe Counterpart Application", issued on Jun. 24, 2022, p. 1-p. 8.
"Notice of Reasons for Refusal of Japan Counterpart Application", issued on Apr. 30, 2025, with English translation thereof, p. 1-p. 8.
"Office Action of Europe Counterpart Application", issued on May 15, 2025, p. 1-p. 5.

* cited by examiner

*Primary Examiner* — Seth A Silverman
(74) *Attorney, Agent, or Firm* — JCIPRNET

(57)          ABSTRACT

An information processing system receives an evaluation on one evaluation target by a user in an aggregate of evaluation targets, to which results of evaluations are to be individually given, and gives a result of the evaluation to another evaluation target different from the one evaluation target in a case where the one evaluation target is evaluated.

20 Claims, 12 Drawing Sheets

Figure 4:
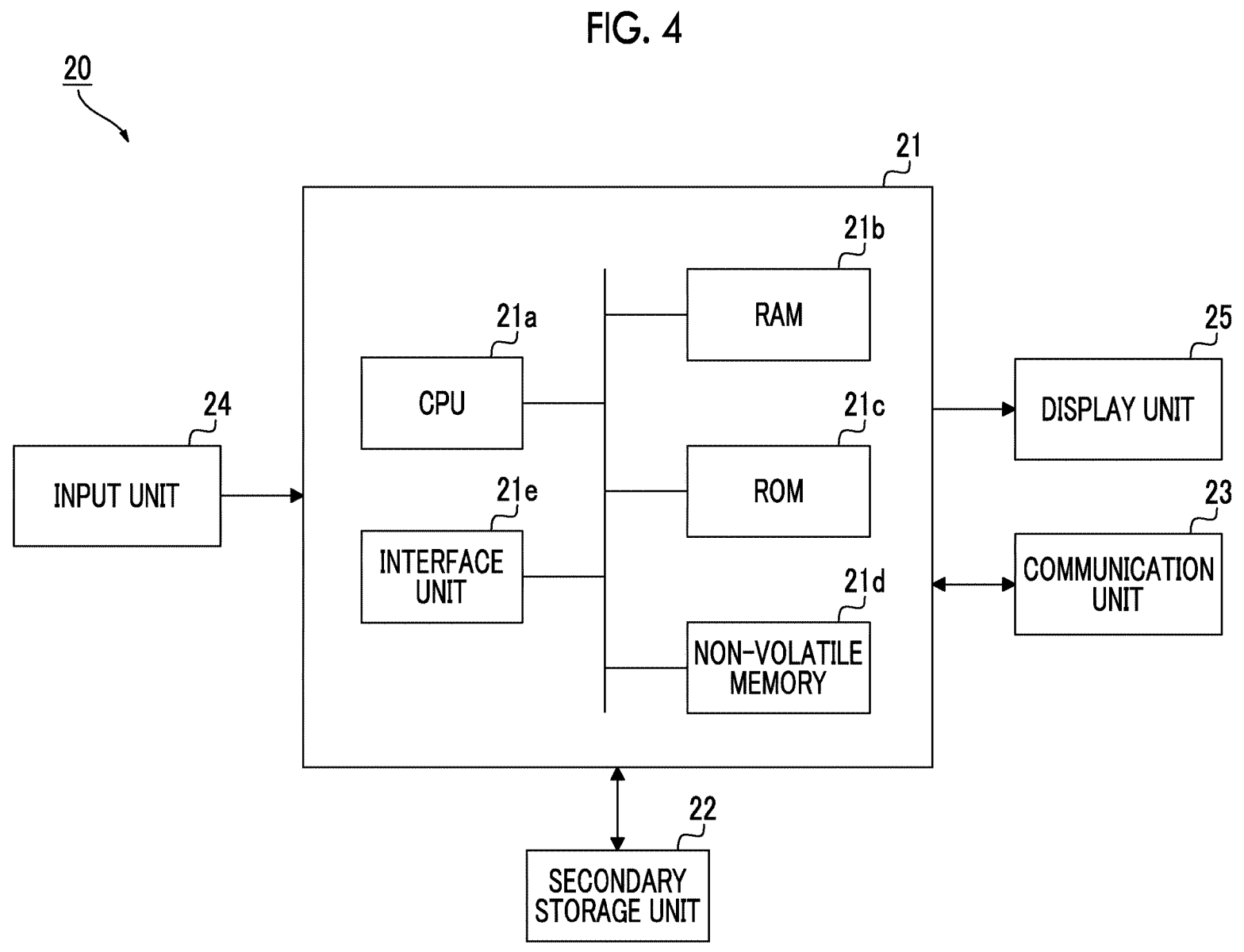

21b RAM

21c ROM

21d NON-VOLATILE MEMORY

21a CPU

21e INTERFACE UNIT

22 SECONDARY STORAGE UNIT

25 DISPLAY UNIT

23 COMMUNICATION UNIT

24 INPUT UNIT

Figure 5:
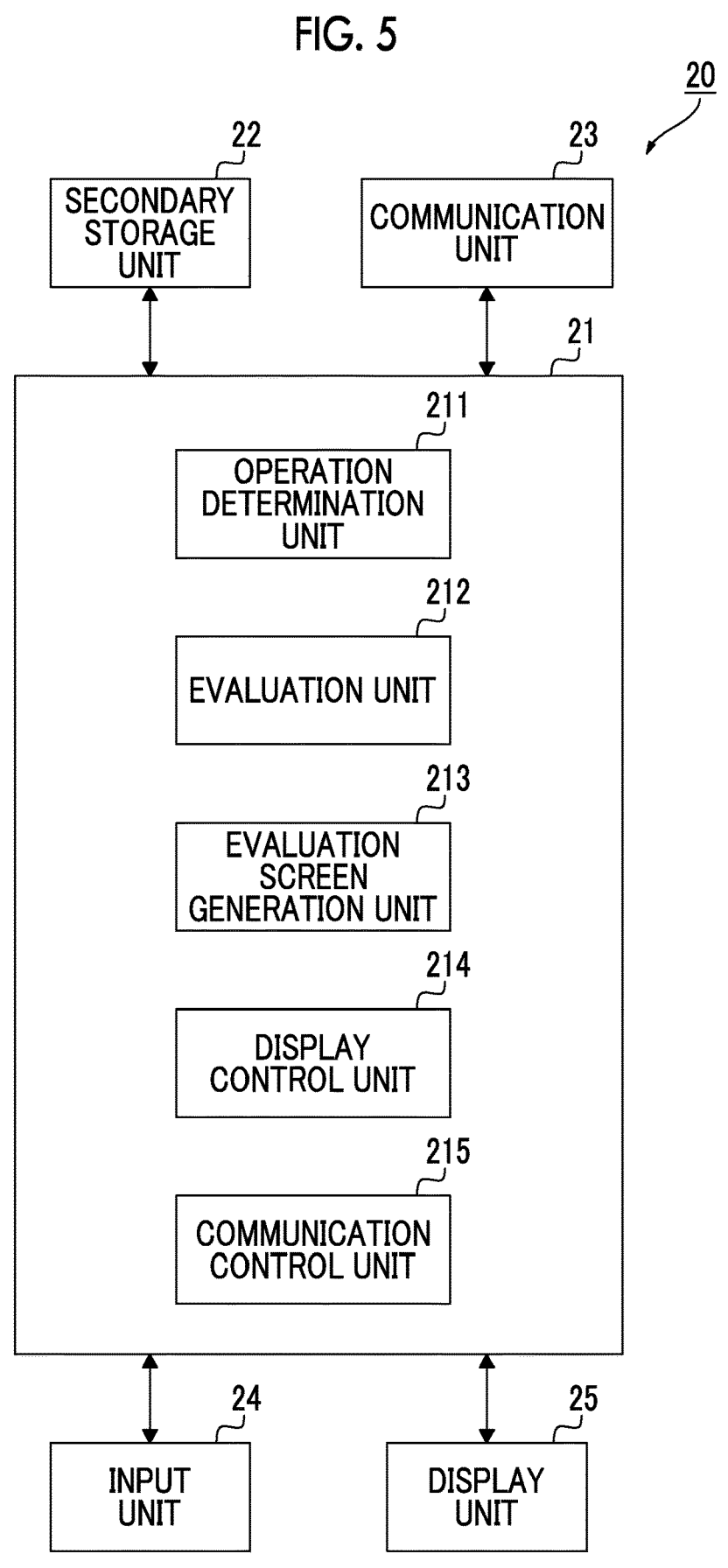

22
SECONDARY
STORAGE
UNIT

23
COMMUNICATION
UNIT

21

211
OPERATION
DETERMINATION
UNIT

212
EVALUATION UNIT

213
EVALUATION
SCREEN
GENERATION UNIT

214
DISPLAY
CONTROL UNIT

215
COMMUNICATION
CONTROL UNIT

24
INPUT
UNIT

25
DISPLAY
UNIT

FIG. 10

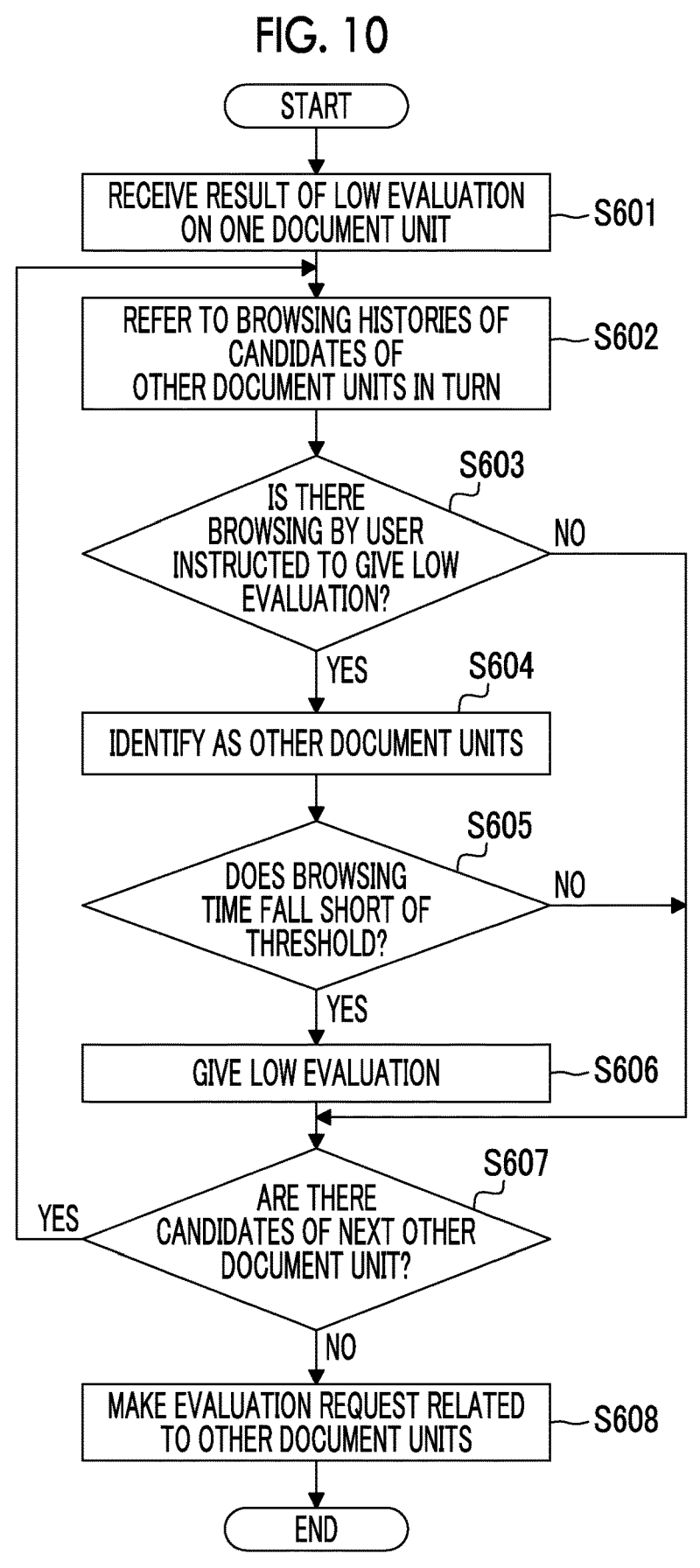

START

RECEIVE RESULT OF LOW EVALUATION ON ONE DOCUMENT UNIT —S601

REFER TO BROWSING HISTORIES OF CANDIDATES OF OTHER DOCUMENT UNITS IN TURN —S602

S603
IS THERE BROWSING BY USER INSTRUCTED TO GIVE LOW EVALUATION?
NO

YES    S604

IDENTIFY AS OTHER DOCUMENT UNITS

S605
DOES BROWSING TIME FALL SHORT OF THRESHOLD?
NO

YES

GIVE LOW EVALUATION —S606

S607
ARE THERE CANDIDATES OF NEXT OTHER DOCUMENT UNIT?
YES

NO

MAKE EVALUATION REQUEST RELATED TO OTHER DOCUMENT UNITS —S608

END

INFORMATION PROCESSING SYSTEM

CROSS-REFERENCE TO RELATED APPLICATIONS

This application is based on and claims priority under 35 USC 119 from Japanese Patent Application No. 2021-157123 filed Sep. 27, 2021.

BACKGROUND

(i) Technical Field

The present invention relates to an information processing system.

(ii) Related Art

JP2005-327145A describes a document management system that can create a document list for a document set, and a configuration where a document list including information, comments, and impressions related to one who browses the document is created in a case where a document in the document list is being browsed.

JP2011-95866A describes a user community support method of displaying posted data on a user terminal in response to a posted data display request from a user including a requester, and a configuration including a function of dividing the posted data into one or more groups, a function of setting an evaluation for each group, and a function of reflecting the evaluation for each group by the user including the requester in a display of the posted data.

SUMMARY

There is a mode in which an evaluation on each evaluation target by a user in an aggregate of a plurality of evaluation targets is received. The user performs an operation of evaluating each evaluation target. However, in a case where the plurality of evaluation targets are evaluated, the user wants to evaluate without switching evaluation targets in some cases.

Aspects of non-limiting embodiments of the present disclosure relate to an information processing system that evaluates the plurality of evaluation targets at once.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing system that receives an evaluation on one evaluation target by a user in an aggregate of evaluation targets, to which results of evaluations are to be individually given, and gives a result of the evaluation to another evaluation target different from the one evaluation target in a case where the one evaluation target is evaluated.

BRIEF DESCRIPTION OF THE DRAWINGS

Exemplary embodiment(s) of the present invention will be described in detail based on the following figures, wherein:

FIG. 4 is a block diagram showing an example of a hardware configuration of a client terminal according to the present exemplary embodiment;

FIG. 5 is a block diagram showing an example of a functional configuration of the client terminal according to the present exemplary embodiment;

FIG. 9A is a view in a case of requesting a high evaluation based on browsing information, FIG. 9B is a view in a case of requesting a high evaluation based on a link relationship, and FIG. 9C is a view in a case of requesting a high evaluation based on a document structure;

FIG. 10 is a flowchart showing procedures of a process in which the management server according to the present exemplary embodiment requests a low evaluation;

DETAILED DESCRIPTION

Overall Configuration of Information Processing System 1

Hereinafter, an exemplary embodiment of the present invention will be described in detail with reference to the accompanying drawings.

Figure 1:
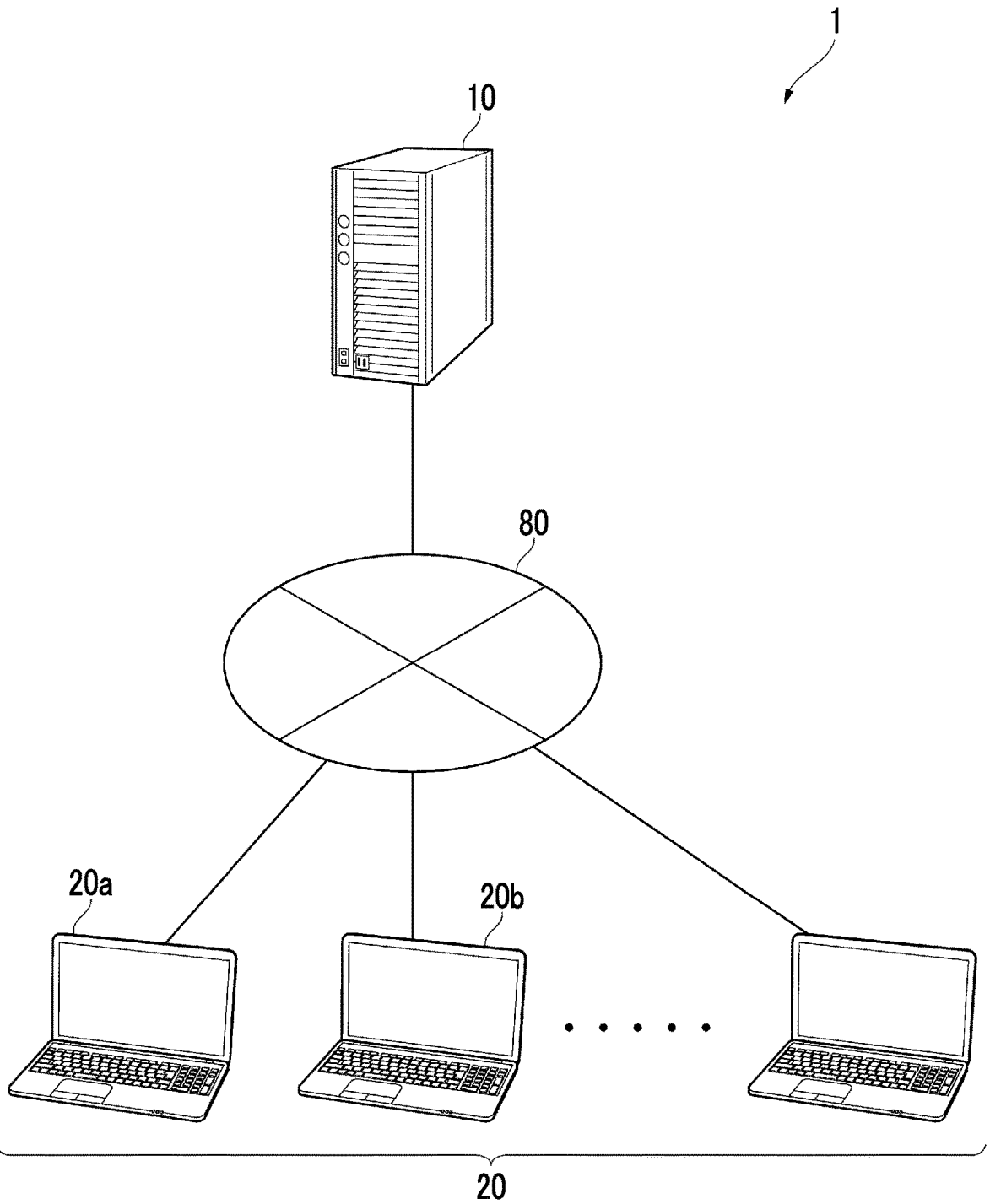
FIG. 1 is a view showing an overall configuration example of an information processing system to which the present exemplary embodiment is applied.

FIG. 1 is a view showing an overall configuration example of an information processing system 1 to which the present exemplary embodiment is applied.

The information processing system 1 according to the present exemplary embodiment includes a management server 10 that manages an aggregate of a plurality of evaluation targets and a client terminal 20 (20a, 20b, . . . ) used in an order for a manager or a user to access the management server 10. The management server 10 and the client terminal 20 are connected to each other via a communication line 80. The communication line 80 is, for example, a line such as the Internet, and is used in information communication between the management server 10 and the client terminal 20. The information processing system 1 of the present exemplary embodiment is a system for the user to perform browsing and evaluating of the aggregate of the plurality of evaluation targets, which is uploaded to the management server 10 by the manager, with the client terminal 20.

In the present exemplary embodiment, "the aggregate of the plurality of evaluation targets" means a collection of the plurality of evaluation targets, which are targets to be individually evaluated, in accordance with a rule determined in advance. Examples of the aggregate of the plurality of evaluation targets include a structured document. Herein, the structured document can be defined as an electronic document configured by a plurality of document units structured in accordance with the rule determined in advance. In addition, the document unit is an example of the evaluation target, and is a unit set in advance, which configures the electronic document held by the management server 10. The document unit is a portion to which a result of an evaluation is individually given. The document unit may include an image in addition to text, or may consist only of an image without including text. Hereinafter, description will be made under the assumption that "the aggregate of the plurality of evaluation targets" is the structured document.

The management server 10 is an example of an information processing device, and is a server that manages documents and manages information related to a document structure. The documents managed by the management server 10 can be shared with a plurality of users, and can be evaluated by one or a plurality of users.

The management server 10 also manages evaluation information related to document units configuring a document. The management server 10 is realized by, for example, a computer. The management server 10 may be configured by a single computer, or may also be realized through a distributed process by a plurality of computers.

The client terminal 20 is an example of the information processing device, and is a device for connecting to the management server 10 via the communication line 80 and performing uploading, browsing, or evaluating of a document. The client terminal 20 has display means that displays an evaluation button image that receives a document or an evaluation on each document unit. In addition, the client terminal 20 has a function of evaluating, in a case where one document unit has been evaluated, another document unit in response to an operation by the user. The client terminal 20 is realized by, for example, a computer, a tablet-type information terminal, a smartphone, and other information processing device.

Hardware Configuration of Management Server 10

Figure 2:
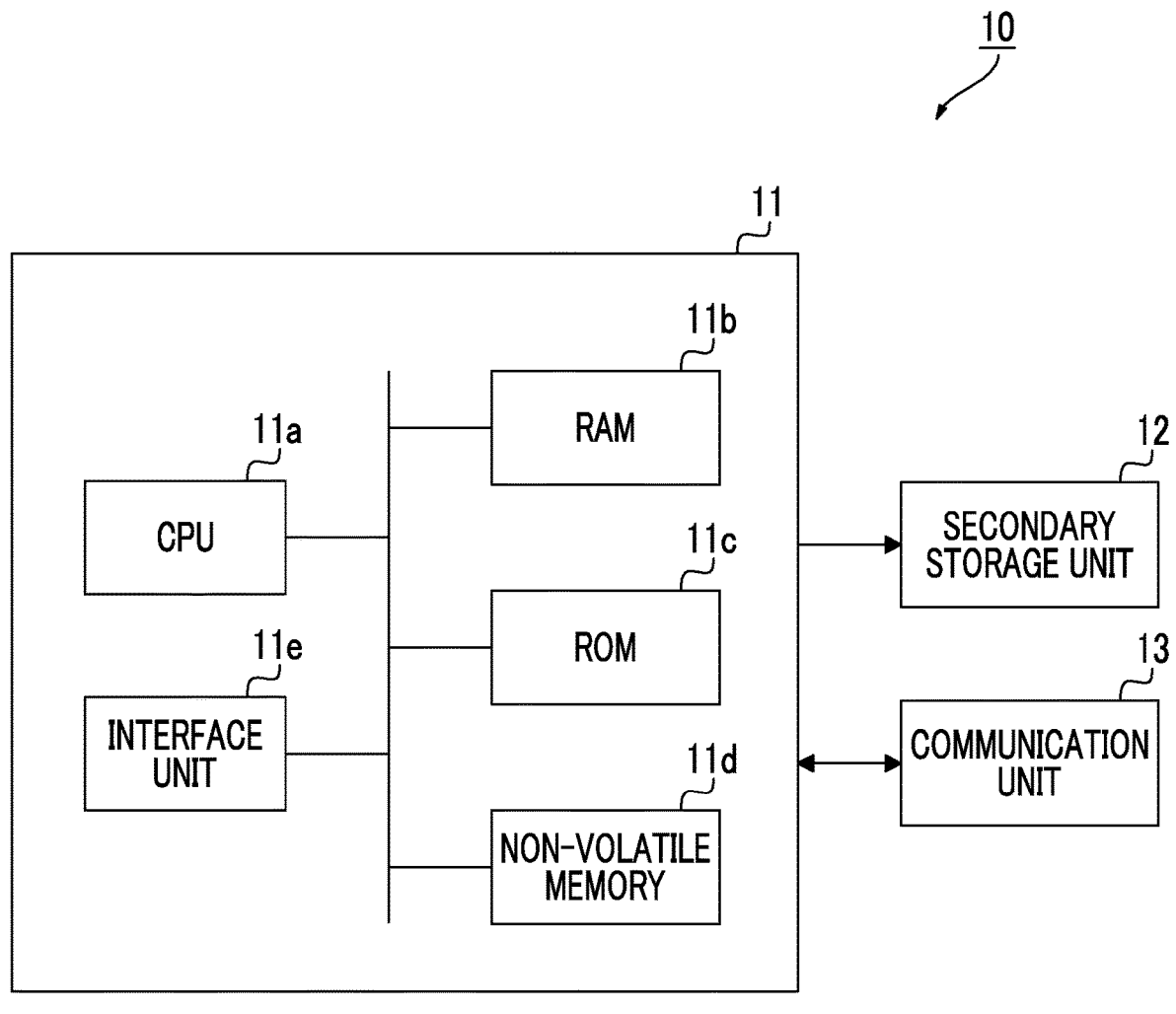
FIG. 2 is a block diagram showing an example of a hardware configuration of a management server according to the present exemplary embodiment.

FIG. 2 is a block diagram showing an example of a hardware configuration of the management server 10 according to the present exemplary embodiment.

The management server 10 according to the present exemplary embodiment has an arithmetic processing unit 11 that executes a digital arithmetic process in accordance with a management program set in advance in a case of managing a structured document, a secondary storage unit 12 that is realized by, for example, a hard disk drive (HDD) in which the management program executed by the arithmetic processing unit 11 is recorded, and a communication unit 13 that receives and transmits information via the communication line 80. As the arithmetic processing unit 11 reads the management program stored in the secondary storage unit 12, each process of the management server 10 of the present exemplary embodiment is executed.

The arithmetic processing unit 11 includes a CPU 11a, which controls the overall device, as an example of a processor, a RAM 11b used as a work memory of the CPU 11a, and a ROM 11c, which stores a management program executed by the CPU 11a. In addition, the arithmetic processing unit 11 includes a non-volatile memory 11d that is rewritable and can hold data also in a case where power supply is interrupted and an interface unit 11e that controls each unit of the communication unit 13, which is connected to the arithmetic processing unit 11. The non-volatile memory 11d is configured by, for example, an SRAM or a flash memory backed up by a battery, and stores information for determining a document unit for which an evaluation request is made.

The secondary storage unit 12 is a storage unit that holds a structured document, information related to a document unit, a browsing history of each document unit, and evaluation information in addition to storing the management program. An evaluation process is performed on the structured document according to the present exemplary embodiment for each document unit. Accordingly, the secondary storage unit 12 manages the held structured document for each document unit.

The structured document may have, for example, a hierarchical structure configured by a chapter, a clause, and a section. Each and every chapter, clause, and section is a document unit.

The document unit is a portion set in advance, such as the chapter, the clause, and the section configuring the structured document, and is a target to be individually evaluated. In a case of adopting a configuration with a hierarchy with multiple stages, such as a document is configured by a plurality of chapters, each chapter is configured by one or a plurality of clauses, and each clause is configured by one or a plurality of sections, the document unit can also be set in multiple layers. For example, one chapter and one or a plurality of clauses included in the chapter are targets to be individually evaluated. In a case where the document unit is hierarchically configured, a hierarchy number is not particularly limited. In addition, the document unit is not limited to a unit explicitly shown in the document including the chapter, the clause, and the section.

The information related to a document unit includes relationship information between document units. The relationship information between document units means information indicating a relationship between document units associated with each other based on a structure of a structured document. In other words, the relationship information between document units is document structure information indicating information representing a document structure. The relationship information between document units includes at least one of a positional relationship between respective document units in a hierarchical structure of a structured document or a link relationship between document units. Examples of information representing a positional relationship between document units include information such as a higher-level document unit, a lower-level document unit, and document units, which have the same proximate higher-level document unit, as for one document unit. In addition, examples of information representing a link relationship between document units include information in which a document unit which is a link source and a document unit which is a link destination are associated with each other in a case where a link to another document unit in the identical structured document or another structured document is set in one document unit.

A browsing history of each document unit is information indicating a record of browsing for each document unit by the user with the client terminal 20. The browsing history includes information of identification of a user who browsed a document unit and date and time when a document unit is displayed on the client terminal 20, and a display time.

Evaluation information is information indicating a result of an evaluation given based on an operation of the client terminal 20 by the user. The evaluation information includes at least one of a result of an evaluation given for each document unit or a result of an evaluation given to relationship information between document units. In addition, the evaluation information is information in which in a case where a plurality of document units are evaluated at once, results of evaluations on the document units and the order, in which the user has browsed the document units, are associated with each other. In addition, other document units different from one document unit, to which a result of an evaluation is given with the evaluation on the one document unit, are aggregated and managed.

Functional Configuration of Management Server 10

Next, a functional configuration of the management server 10 will be described.

Figure 3:
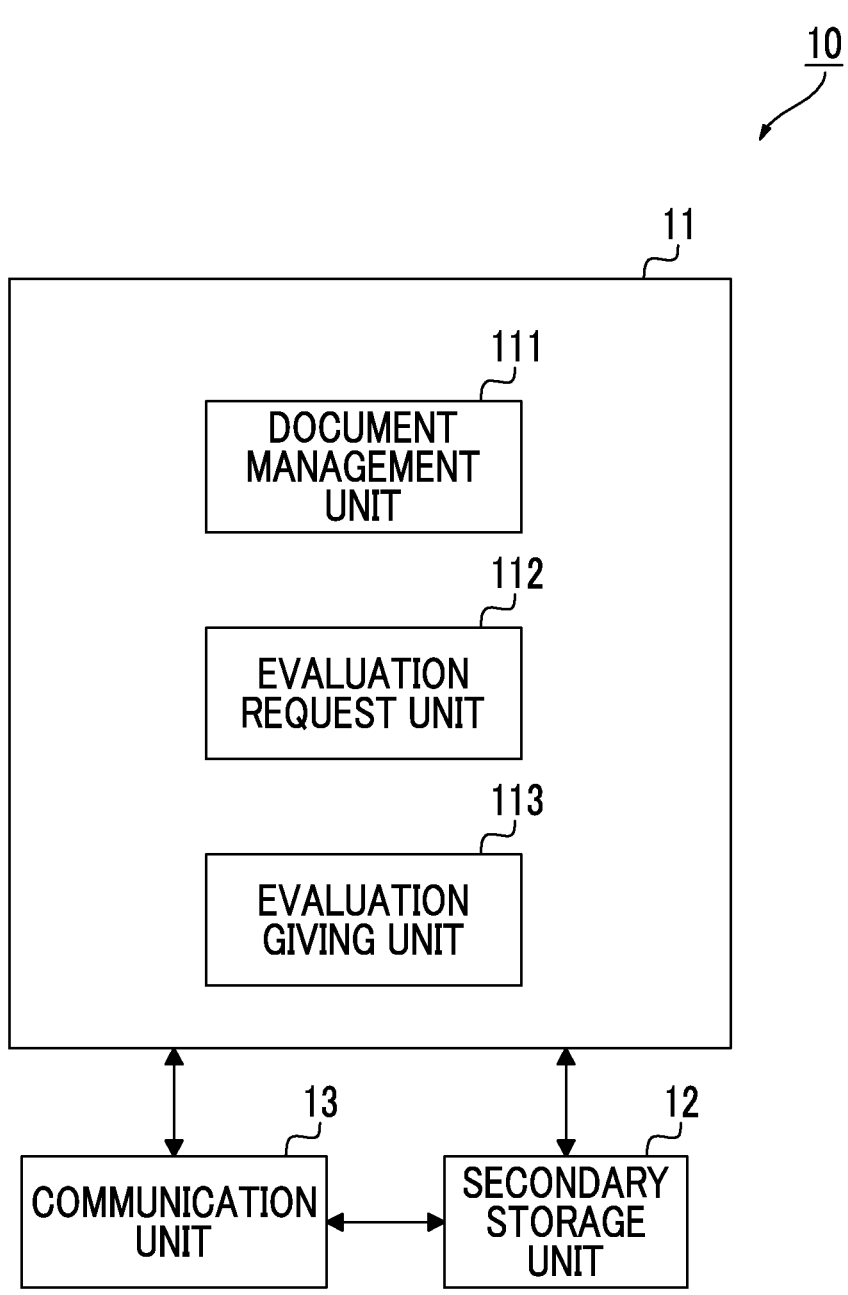
FIG. 3 is a block diagram showing an example of a functional configuration of the management server according to the present exemplary embodiment.

FIG. 3 is a block diagram showing an example of a functional configuration of the management server 10 according to the present exemplary embodiment. The management server 10 has a document management unit 111 that acquires or provides a structured document, an evaluation request unit 112 that requests an evaluation on a document unit, and an evaluation giving unit 113 that gives a result of the evaluation to the document unit. The document management unit 111, the evaluation request unit 112, and the evaluation giving unit 113 are realized by the arithmetic processing unit 11 (see FIG. 2). In FIG. 3, the secondary storage unit 12 (see FIG. 2) stores a structured document, and the communication unit 13 (see FIG. 2) receives a request from the client terminal 20 or transmits a requested structured document.

The document management unit 111 is processing means that manages a structured document held by the secondary storage unit 12 and information related to a document unit. The document management unit 111 newly acquires a structured document or reflects an edited content in a structured document held by the secondary storage unit 12, in response to a request from the client terminal 20. In addition, in response to the request from the client terminal 20, the document management unit 111 reads a structured document or evaluation information, which is related to the request, from the secondary storage unit 12, and provides the client terminal 20, which has made the request, with the structured document or the evaluation information.

The evaluation request unit 112 is processing means that makes an evaluation request related to each document unit to be evaluated. In a case where an evaluation related to one document unit is received from the client terminal 20, the evaluation request unit 112 according to the present exemplary embodiment makes an evaluation request for another document unit related to the one document unit. In a case where the other document unit satisfies a condition set in advance, the evaluation request unit 112 determines that the other document is related to the one document unit and makes an evaluation request for another document unit. Examples of the condition determined in advance include a document unit related to one document unit based on relationship information between document units, the document unit browsed by the user who has evaluated the one document unit. A process of an evaluation request to the client terminal 20, which is made by the evaluation request unit 112, is performed, for example, by notifying the user, who has evaluated the one document unit, of the evaluation request.

The evaluation giving unit 113 is processing means that gives a result of an evaluation to a document unit. The evaluation giving unit 113 according to the present exemplary embodiment automatically gives, based on relationship information between document units or a browsing history, a result of an evaluation to another document unit related to one document unit without requesting an evaluation to the user. In a case where the other document unit satisfies a condition set in advance, the evaluation giving unit 113 determines to give a result of an evaluation to the other document unit related to the one document unit and gives the result of the evaluation to the other document unit. Examples of the condition determined in advance include a document unit browsed by the user, who has evaluated one document unit, the document unit of which a browsing time by the user, who has evaluated the one document unit, does not satisfy a threshold.

Hardware Configuration of Client Terminal 20

FIG. 4 is a block diagram showing an example of a hardware configuration of the client terminal 20 according to the present exemplary embodiment. The client terminal 20 according to the present exemplary embodiment has an arithmetic processing unit 21 that executes a digital arithmetic process in accordance with an evaluation program which evaluates a document unit, a secondary storage unit 22 that is realized by, for example, a hard disk drive (HDD) in which a structured document is recorded, and a communication unit 23 that receives and transmits information via the communication line 80. In addition, the client terminal has an input unit 24 such as a key and a touch panel which receive an input operation from the user and a display unit 25 that consists of a liquid crystal display panel or an organic electroluminescence (EL) display panel, which displays an image or text for the user.

The arithmetic processing unit 21 includes a CPU 21a, which controls the overall device, as an example of the processor, a RAM 21b used as a work memory of the CPU 21a, and a ROM 21c, which stores the evaluation program executed by the CPU 21a. In addition, the arithmetic processing unit 21 includes a non-volatile memory 21d that is rewritable and can hold data also in a case where power supply is interrupted and an interface unit 21e that controls each unit of the input unit 24, which is connected to the arithmetic processing unit 21. The non-volatile memory 21d is configured by, for example, an SRAM or a flash memory backed up by a battery, and stores a browsing history of a document unit and evaluation information. In addition, the secondary storage unit 22 stores the evaluation program executed by the arithmetic processing unit 21, in addition to storing a structured document. As the arithmetic processing unit 21 reads the evaluation program stored in the secondary storage unit 22, each process of the client terminal 20 of the present exemplary embodiment is executed.

Functional Configuration of Client Terminal 20

Next, a functional configuration of the client terminal 20 will be described.

FIG. 5 is a block diagram showing an example of a functional configuration of the client terminal 20 according to the present exemplary embodiment. The client terminal 20 has an operation determination unit 211 that determines an operation by the user, an evaluation unit 212 that gives a result of an evaluation to a document unit, an evaluation screen generation unit 213 that generates an evaluation screen, a display control unit 214 that controls a display of the evaluation screen, and a communication control unit 215 that controls reception and transmission of information to and from the management server 10. The operation determination unit 211, the evaluation unit 212, the evaluation screen generation unit 213, the display control unit 214, and the communication control unit 215 are realized by the arithmetic processing unit 21 (see FIG. 4).

The operation determination unit 211 determines whether or not an operation by the user via the input unit 24 has been performed. Examples of the operation by the user include an operation of selecting a structured document to be browsed and an operation of evaluating a document unit.

The evaluation unit 212 is processing means that performs an evaluation related to a document unit. The evaluation unit 212 according to the present exemplary embodiment receives an evaluation operation by the user based on the determination of the operation determination unit 211 and evaluates a structured document. The evaluation on the structured document is performed for each document unit. For example, in a case where one document unit included in the structured document has been evaluated, the evaluation is treated as an evaluation on the one document unit. In addition, in a case where a plurality of document units have been evaluated, the evaluations are treated as evaluations on the plurality of respective corresponding document units, which have been performed. The contents of evaluations may include whether or not each of document units configuring the structured document or a relationship between document units has received not only a high evaluation but also a low evaluation.

The evaluation screen generation unit 213 is processing means that generates an evaluation screen which collectively receives evaluations on a plurality of document units in a case where an operation by the user satisfies a condition set in advance. Examples of the condition set in advance include an operation in which the user instructs an evaluation on one document unit, the operation in which the user instructs termination of a display of a structured document. The evaluation screen may show a positional relationship between a plurality of document units, which are targets of evaluations. The evaluation screen generation unit 213 extracts document structure information of a structured document from relationship information between document units received from the management server 10 and generates an evaluation screen based on the extracted document structure information. The evaluation screen may be configured as, for example, a tree diagram (a document structure diagram through a tree display). The evaluation screen may include information of an evaluation state of each document unit. In a case where the evaluation unit 212 has evaluated one document unit, an evaluation state based on the evaluation result may be reflected in the evaluation screen. In addition, the evaluation screen generation unit 213 extracts a browsing history of each document unit from a browsing history received from the management server 10 and generates an evaluation screen based on the extracted browsing history. The evaluation screen generation unit 213 generates, for example, a high evaluation screen that receives a high evaluation and a low evaluation screen that receives a low evaluation.

The display control unit 214 is control means that controls a display of an evaluation screen generated by the evaluation screen generation unit 213. The display control unit 214 displays, on the display unit 25 of the client terminal 20, the evaluation screen generated by the evaluation screen generation unit 213. The display control unit 214 may display, on the evaluation screen, an evaluation state of each document unit. For example, in a case of using a tree diagram, a mark indicating an evaluation state may be assigned to each document unit. In addition, the display control unit 214 may display a link relationship between document units. A display mode of the display unit 25 of the client terminal 20 will be described later.

The communication control unit 215 is control means that receives information related to a structured document from the management server 10. Specifically, the communication control unit 215 acquires relationship information between document units related to a structured document, which is a target of browsing or evaluating, a browsing history, and evaluation information via the communication unit 23. In addition, the communication control unit 215 is control means that transmits evaluation information on document units configuring the structured document to the management server 10. Specifically, in a case where an operation of an evaluation is received by the operation determination unit 211, the communication control unit 215 transmits an instruction command for instructing the received evaluation to the management server 10 via the communication unit 23. With the instruction command, the management server 10 notifies the user of the evaluation request.

Display Mode of Display Unit 25 of Client Terminal 20

Figure 6:
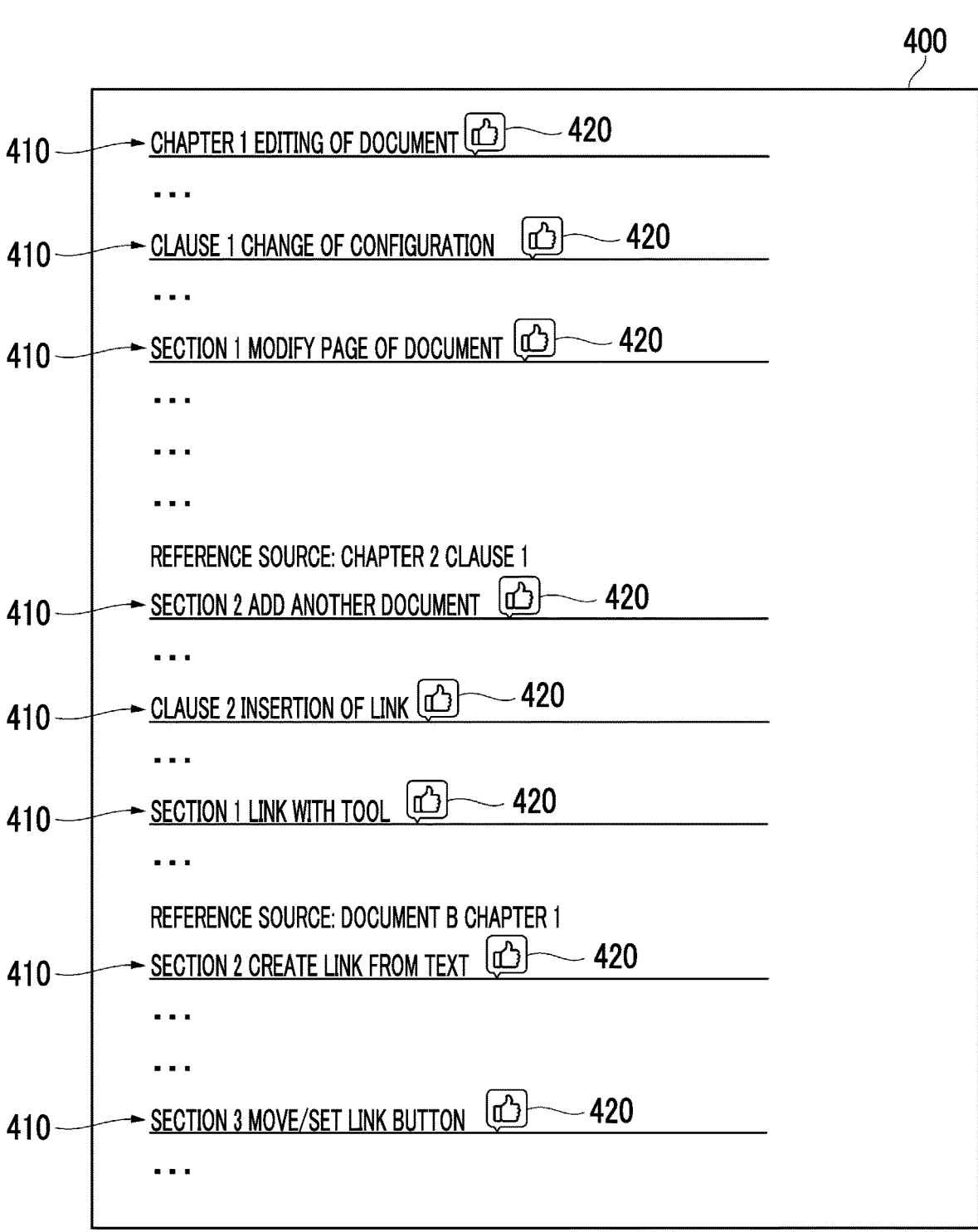
FIG. 6 is a view showing an example of a document to which the present exemplary embodiment is applied.

FIG. 6 is a view showing an example of a document 400 to which the present exemplary embodiment is applied.

The display unit 25 of the client terminal 20 according to the present exemplary embodiment displays the document 400 including document units 410, such as a plurality of chapters, clauses, and sections, and high evaluation button images 420 each of which receives an instruction of a high evaluation on each document unit 410, as shown in FIG. 6. In addition, a scroll image that receives a scroll operation by the user may be displayed on the document 400.

The document 400 is an electronic document that is hierarchically configured by chapters, clauses, and sections, which are set in advance as the document units 410. In addition, the document 400 is not limited to having a hierarchical structure, and may not have a positional relationship between the document units 410, such as a higher-level and a lower-level.

The document unit 410 is a portion set in advance, such as the chapters, the clauses, and the sections configuring the document 400, and is a target to be individually evaluated.

The high evaluation button image 420 is an example of the evaluation button image, and receives an instruction in which the user gives a high evaluation to each document unit 410. Specific examples of the high evaluation include "like", "useful", "agree", "favorite", and "bookmark".

Figure 7:
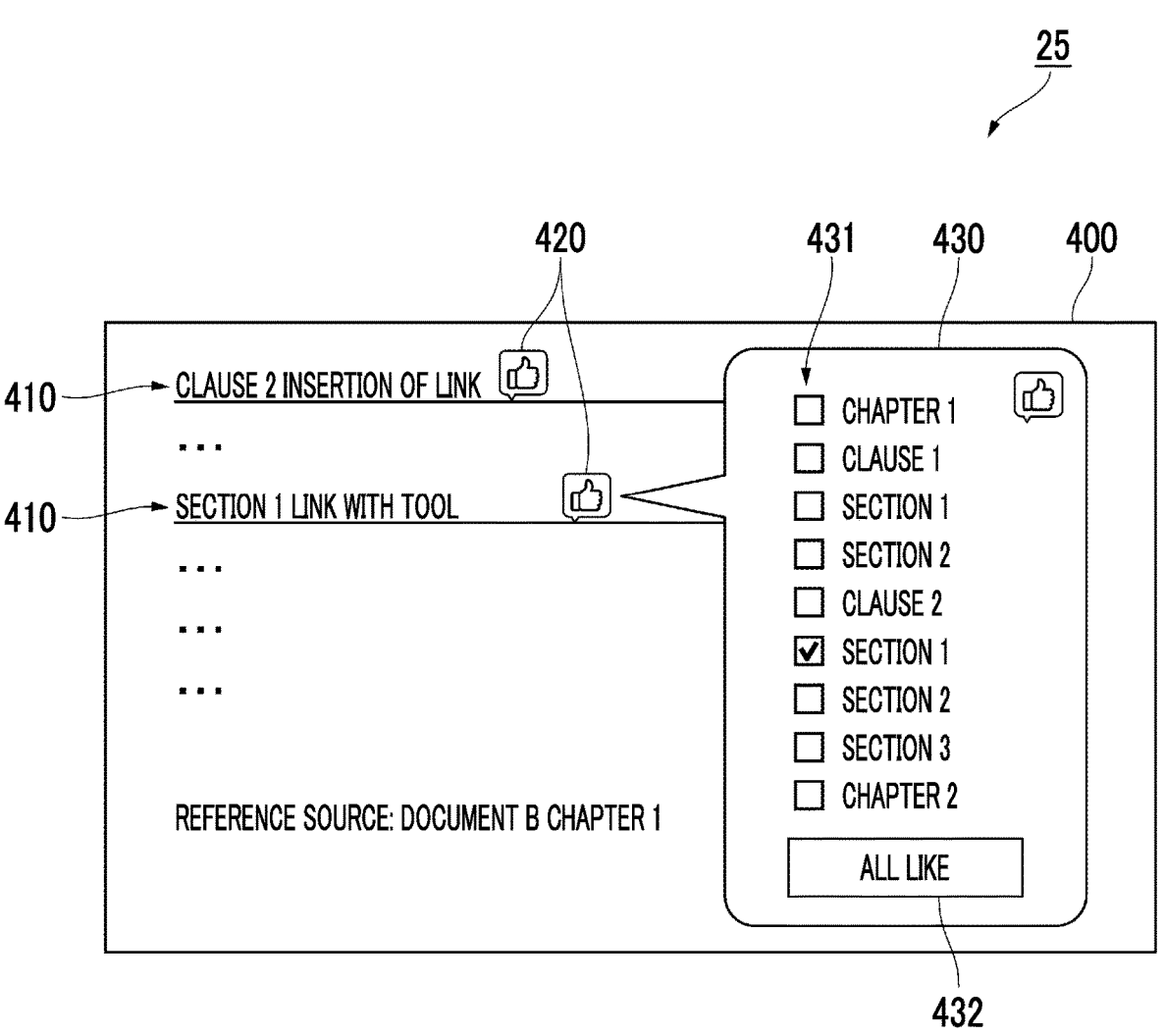
FIG. 7 is a view showing an example of a high evaluation screen to which the present exemplary embodiment is applied.

FIG. 7 is a view showing an example of a high evaluation screen 430 to which the present exemplary embodiment is applied.

The display unit 25 of the client terminal 20 according to the present exemplary embodiment displays the high evaluation screen 430 including selection button images 431 for selecting the document units 410 to which high evaluations are to be given and a collective high evaluation button image 432 for collectively receiving instructions of the high evaluations on the document units 410 corresponding to the plurality of selection button images 431, as shown in FIG. 7.

The high evaluation screen 430 is an example of the evaluation screen, and is a screen that receives high evaluations on the plurality of document units 410 configuring the document 400. The high evaluation screen 430 requests the user to give high evaluations to other document units 410 different from the document unit 410 corresponding to one high evaluation button image 420 selected by the user. It is assumed that the other document units 410 are related to the document unit 410, to which a result of an evaluation is given by the user with the high evaluation button images 420 based on relationship information between document units. In addition, the high evaluation screen 430 is displayed by being associated with, for example, the high evaluation button image 420 corresponding to "Section 1" of "Clause 2", which is the document unit 410 evaluated by the user.

The selection button image 431 is an example of the evaluation button image, and receives an operation of selecting the document unit 410 to which a high evaluation is to be given, among the other document units 410 for which high evaluations are requested from the user. An evaluation to be received by the selection button image 431 is the identical evaluation to the evaluation on the document unit 410 to which a result of an evaluation is given by the user with the high evaluation button image 420. In addition, the selection button image 431 may receive an operation of selecting another document unit 410 to be evaluated and an operation of selecting a result of an evaluation. In other words, the selection button image 431 may give a result of an evaluation different from a result of an evaluation on the document unit 410 to which the result of the evaluation is given by the user with the high evaluation button image 420. In addition, the selection button image 431 may receive an operation of changing a result of an evaluation on the document unit 410 to which the result of the evaluation is given by the user with the high evaluation button image 420.

The collective high evaluation button image 432 is an example of the evaluation button image, and collectively receives instructions of high evaluations on the document units 410 included in the high evaluation screen 430. The collective high evaluation button image 432 receives an operation of bringing all of the selection button images 431 on the high evaluation screen 430 into a selected state. In the example of FIG. 7, the collective high evaluation button image 432 receives an instruction to make the plurality of other document units 410 "all like".

Process of Requesting High Evaluation on Plurality of Document Units 410

Next, a request for high evaluations on the plurality of document units 410 will be described with reference to FIGS. 3, 6, 8, and 9. Herein, a case where a result of a high evaluation is given to each document unit 410 in the document 400 configured by a plurality of chapters, clauses, and sections, which are in a hierarchical relationship, will be described as an example.

Figure 8:
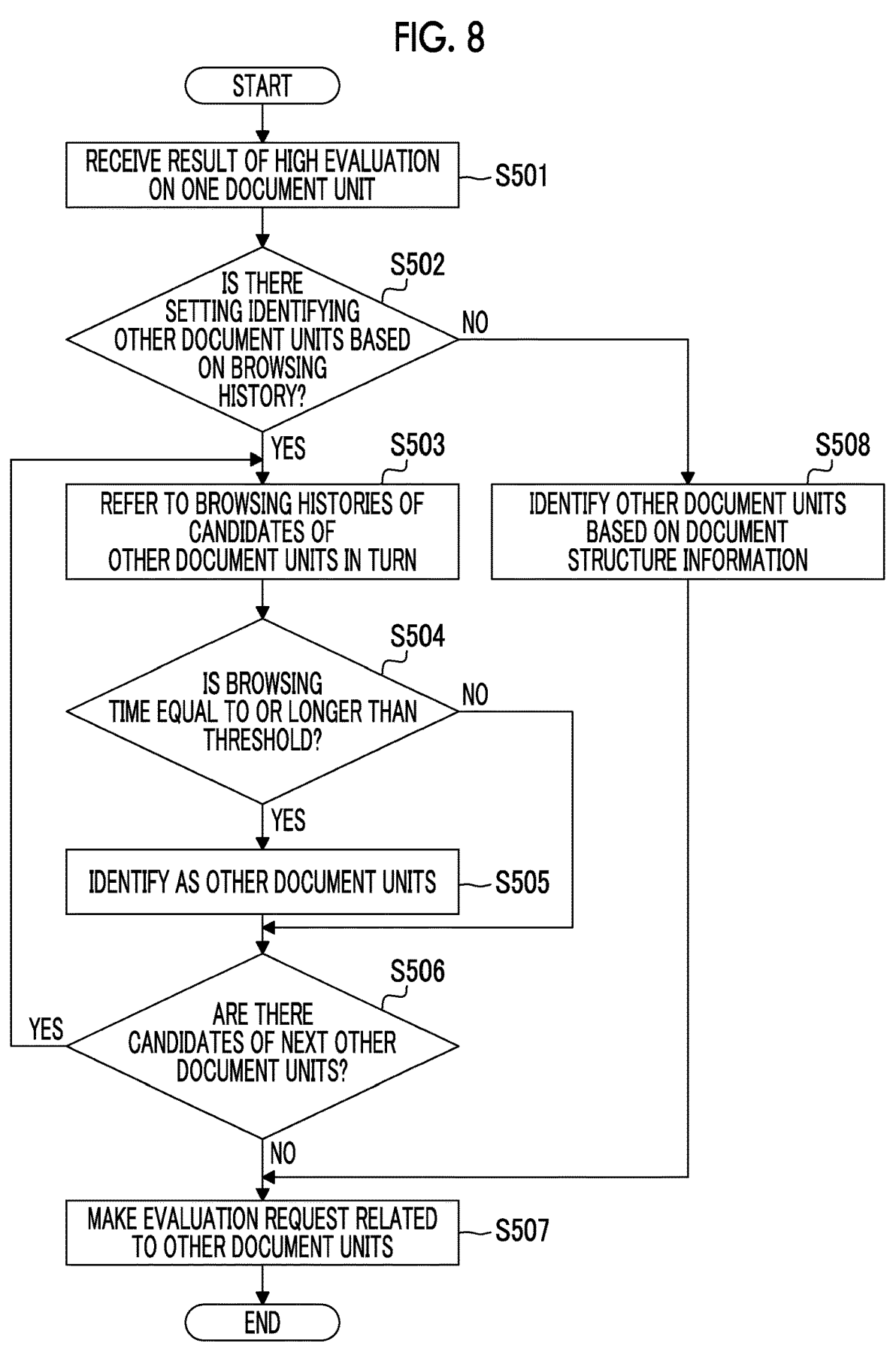
FIG. 8 is a flowchart showing procedures of a process in which the management server according to the present exemplary embodiment requests a high evaluation.

FIG. 8 is a flowchart showing procedures of a process in which the management server 10 according to the present exemplary embodiment requests a high evaluation.

Figures 9A, 9B, 9C:
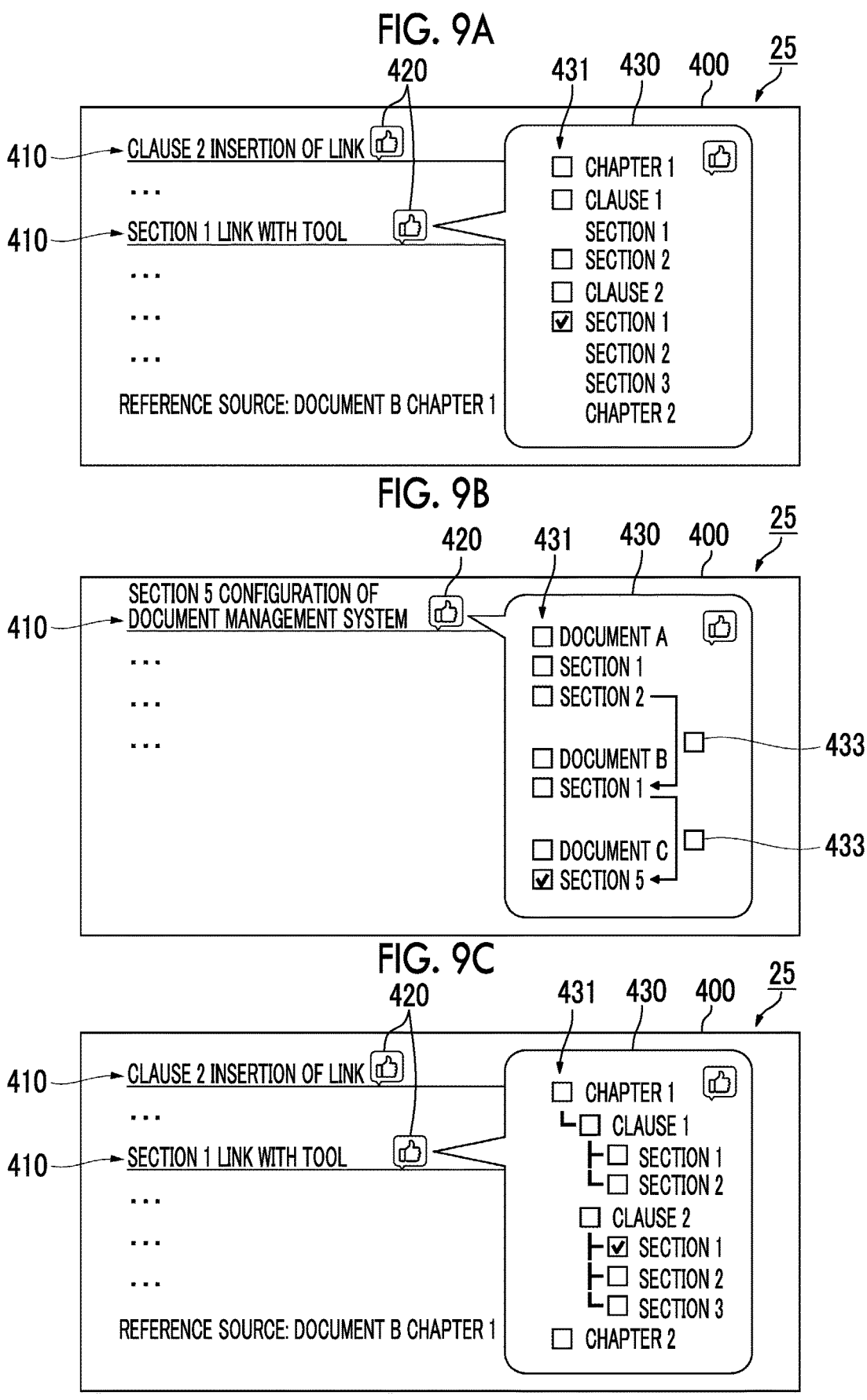
FIGS. 9A to 9C are views showing examples of the high evaluation screen to which the present exemplary embodiment is applied.

FIGS. 9A to 9C are views showing examples of display modes of the high evaluation screen 430 to which the present exemplary embodiment is applied. FIG. 9A is a view in a case of requesting a high evaluation based on browsing information. FIG. 9B is a view in a case of requesting a high evaluation based on a link relationship. FIG. 9C is a view in a case of requesting a high evaluation based on a document structure.

The display unit 25 of the client terminal 20 according to the present exemplary embodiment displays the high evaluation screen 430 associated with the high evaluation button image 420 corresponding to "Clause 2 Section 1", which is one document unit 410 which is selected and evaluated by the user, as shown in FIGS. 9A to 9C.

In the flowchart shown in FIG. 8, the management server 10 receives a result of a high evaluation on the one document unit 410 from the client terminal 20 (S501). For example, in a case where the high evaluation button image 420 corresponding to "Section 1 Link with tool" positioned under "Chapter 1 Clause 2 Insertion of link" shown in FIG. 6 is selected by the user with the client terminal 20, the management server 10 according to the present exemplary embodiment receives a result of an evaluation of "Section 1 Link with tool" as a result of a high evaluation on the one document unit 410.

Next, the evaluation request unit 112 shown in FIG. 3 determines, based on a browsing history held by the secondary storage unit 12, whether or not a setting is such that the other document units 410 related to the one document unit 410, to which a result of an evaluation is selectively given from the client terminal 20, are identified (S502).

In a case where the setting is such that the other document units 410 are identified based on browsing information (Yes in S502), the evaluation request unit 112 refers to candidate browsing histories of the other document units 410 related to the one document unit 410 in turn (S503). The evaluation request unit 112 according to the present exemplary embodiment refers to browsing histories of the document units 410 as candidates of the other document units 410 related to the one document unit 410, in an order from the document unit 410 of which date and time displayed by the display unit 25 of the client terminal 20 is the latest.

The evaluation request unit 112 determines, based on the referred browsing histories, whether or not candidate browsing times of the other document units 410 related to the one document unit 410 are equal to or longer than a threshold (S504). In a case where the browsing times of the document units 410 fall below the threshold (No in S504), processing proceeds to Step S506.

In a case where the browsing times of the candidates of the other document units 410 related to the one document unit 410 are equal to or longer than the threshold in Step S504 (Yes in S504), the evaluation request unit 112 identifies the candidates of the other document units as the other document units 410 related to the one document unit 410 (S505).

Next, the evaluation request unit 112 determines, based on the browsing histories held by the secondary storage unit 12, whether or not there are candidates of the other document units 410 related to the next one document unit 410 (S506).

In a case where there are candidates of the other document units 410 related to the next one document unit 410 (Yes in S506), processing proceeds to Step S503, and the process is repeated.

In a case where there are no candidates of the other document units 410 related to the next one document unit 410 in Step S506 (No in S506), the evaluation request unit 112 makes an evaluation request related to the identified other document units 410 (S507), and terminates the process.

Herein, the high evaluation screen 430 generated by the evaluation screen generation unit 213 of the client terminal 20 in a case where the other document units 410 are identified based on browsing information will be described with a specific example. The high evaluation screen 430 shown in FIG. 9A receives evaluations on the document units 410 configuring the document 400 together with the one document unit 410, the document units 410 browsed by the user. The high evaluation screen 430 displays the selection button images 431 corresponding to the plurality of document units 410 hierarchically configuring the document 400 in an order of browsing.

For example, although "Chapter 1 Clause 1 Section 1 Modify page of document" shown in FIG. 6 is displayed on the display unit 25, in a case where the user has skipped reading, the selection button image 431 corresponding to "Chapter 1 Clause 1 Section 1 Modify page of document" is not displayed. Further, in a case where the document units 410 after "Chapter 1 Clause 2 Section 2 Create link from text" are not displayed on the display unit 25, the selection button images 431 are not displayed. In addition, although text information is displayed on the high evaluation screen 430 shown in FIG. 9A as an example of a display showing whether the selection button image 431 corresponding to any document unit 410 is hidden, the text information may be displayed through gray scale. In other words, in a case where a time for which the user has browsed the document units 410 configuring the document 400 does not satisfy a threshold set in advance, evaluations on the document units 410 are not received.

In the example shown in FIG. 9B, the user browses "Document A Section 1", "Document A Section 2", "Document B Section 1", and "Document C Section 5" in this order, the high evaluation button image 420 corresponding to "Document C Section 5" is selected by the user. In the example shown in FIG. 9B, a link from "Document A Section 2" to "Document B Section 1" and a link from "Document B Section 1" to "Document C Section 5" are set as link relationships.

The high evaluation screen 430 shown in FIG. 9B includes the selection button images 431 that receive evaluations on the other document units 410 and selection button images 433 that receive an evaluation on a relationship between the document unit 410, which is a link source, and the document unit 410, which is a link destination. In order to clearly notify the user of the link relationship, text information indicating the document unit 410, which is the link source, and text information indicating the document unit 410, which is the link destination, are displayed by being associated with each other by an arrow.

In a case where the selection button image 431 corresponding to each of the document unit 410, which is the link source, and the document unit 410, which is the link destination, is selected by the user, the selection button image 433 corresponding to the relationship between the document unit 410, which is the link source, and the document unit 410, which is the link destination, is automatically brought into a selected state. In addition, in a case where the selection button image 433 is selected by the user, the selection button image 431 corresponding to each of the document unit 410, which is the link source, and the document unit 410, which is the link destination, may be automatically brought into a selected state.

In a case where the setting is such that the other document units 410 are not identified based on the browsing history in Step S502 (No in S502), the evaluation request unit 112 identifies the other document units 410 based on document structure information held by the secondary storage unit 12 (S508). The evaluation request unit 112 according to the present exemplary embodiment identifies the other document units 410 configuring the document 400 together with the one document unit 410. The evaluation request unit 112 makes an evaluation request related to the identified other document units 410 (S507), and terminates the process.

Herein, the high evaluation screen 430 generated by the evaluation screen generation unit 213 of the client terminal 20 in a case where the other document units 410 are identified based on document structure information will be described with a specific example. The high evaluation screen 430 shown in FIG. 9C shows aggregate structure information of the document 400 in a tree display. In the shown example, as correspondences are shown by lines, "Clause 1" and "Clause 2" are positioned under "Chapter 1", and "Section 1" and "Section 2" are positioned under "Clause 1". Accordingly, in a case where the plurality of document units 410 are evaluated at once on the high evaluation screen 430, the user is notified of connection or classification of each document unit 410.

In addition, in a case where the selection button images 431 corresponding to "Clause 1" and "Clause 2" positioned above "Section 1" and "Section 2" are selected by the user, the selection button images 431 corresponding to "Section 1" and "Section 2" positioned under the document units 410 to which results of evaluations are given are automatically brought into a selected state. In other words, in a case where the configuration of the document 400 has a hierarchical structure, a result of an evaluation that is identical to a result of an evaluation on the higher-level document unit 410 is given to the lower-level document unit 410 linked to the higher-level document unit 410.

Process of Requesting Low Evaluation on Plurality of Document Units 410

Although a configuration where high evaluations on the plurality of document units 410 are requested has been described in the example described above, the invention is not limited thereto. A request for low evaluations on the plurality of document units 410 will be described with reference to FIGS. 3, 6, 10, and 11. Herein, a case where a result of a low evaluation is given to each document unit 410 in the document 400 configured by a plurality of chapters, clauses, and sections, which are in a hierarchical relationship, will be described as an example. In addition, a case where there is a setting in which the other document units 410 related to the one document unit 410 are identified based on a browsing history will be described as an example.

FIG. 10 is a flowchart showing procedures of a process in which the management server 10 according to the present exemplary embodiment requests a low evaluation.

Figure 11:
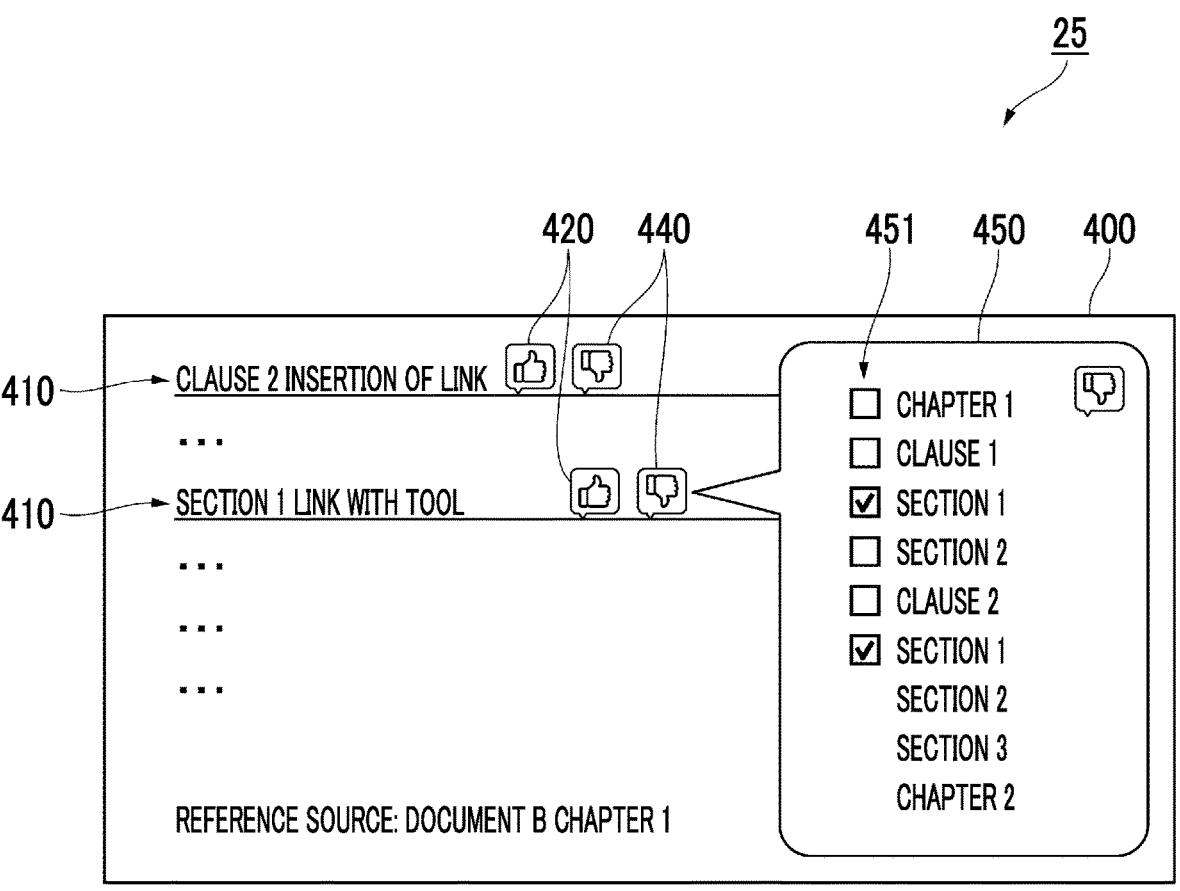
FIG. 11 is a view showing an example of a low evaluation screen to which the present exemplary embodiment is applied.

FIG. 11 is a view showing an example of a low evaluation screen 450 to which the present exemplary embodiment is applied.

The display unit 25 of the client terminal 20 according to the present exemplary embodiment displays the low evaluation screen 450 including selection button images 451 receiving low evaluations on the other document units 410, as shown in FIG. 11. The low evaluation screen 450 is displayed by being associated with, for example, a low evaluation button image 440 corresponding to a "Clause 2 Section 1", which is the one document unit 410 selected and evaluated by the user.

The low evaluation button image 440 is an example of the evaluation button image, and receives an instruction in which the user gives a low evaluation to each document unit 410. Specific examples of the low evaluation include "dislike", "useless", "disagree", "do not like", and "do not want to see again".

The selection button image 451 is an example of the evaluation button image, and receives an operation of selecting the document unit 410 to which a low evaluation is be given, among the other document units 410 for which low evaluations are requested from the user.

In the flowchart shown in FIG. 10, the management server 10 receives a result of a low evaluation on the one document unit 410 from the client terminal 20 (S601). For example, in a case where the low evaluation button image 440 corresponding to "Section 1 Link with tool" positioned under "Chapter 1 Clause 2 Insertion of link" shown in FIG. 11 is selected by the user with the client terminal 20, the management server 10 according to the present exemplary embodiment receives a result of an evaluation on "Section 1 Link with tool" as a result of a low evaluation on the one document unit 410.

Next, the evaluation request unit 112 shown in FIG. 3 refers to browsing histories of candidates of the other document units 410 related to the one document unit 410 in turn (S602). The evaluation request unit 112 according to the present exemplary embodiment refers to the browsing histories of the candidates of the other document units 410 related to the one document unit 410, in an order from the document unit 410 of which date and time displayed by the display unit 25 of the client terminal 20 is the latest.

The evaluation request unit 112 determines, based on the referred browsing histories, whether or not the candidates of the other document units 410 related to the one document unit 410 have been browsed by the user instructed to give a low evaluation on the one document unit 410 (S603).

In a case where there is no browsing by the user instructed to give a low evaluation on the one document unit 410 (No in S603), processing proceeds to Step S607.

In a case where there is browsing by the user instructed to give a low evaluation on the one document unit 410 (Yes in S603), the evaluation request unit 112 identifies the candidates of the other document units 410 related to the one document unit 410 as the other document units 410 (S604).

The evaluation request unit 112 determines, based on the referred browsing histories, whether or not browsing times of the identified other document units 410 fall short of the threshold (S605).

In a case where the browsing times of the identified other document units 410 are equal to or longer than the threshold (No in S605), processing proceeds to Step S607.

In a case where the browsing times of the identified other document units 410 fall short of the threshold (Yes in S605), the evaluation giving unit 113 gives results of low evaluations to the identified other document units 410 (S606).

Herein, the low evaluation screen 450 generated by the evaluation screen generation unit 213 of the client terminal 20 in a case where results of low evaluations are given to the document units 410 identified based on the browsing histories will be described with a specific example. The low evaluation screen 450 shown in FIG. 11 receives low evaluations on the document units 410 configuring the document 400 together with the one document unit 410, the document units 410 having browsing histories.

For example, in a case where the user has skipped reading "Chapter 1 Clause 1 Section 1 Modify page of document" displayed on the display unit 25 shown in FIG. 6, a result of a low evaluation is given with the management server 10. In such a case, the selection button image 451 corresponding to "Chapter 1 Clause 1 Section 1 Modify page of document" shown in FIG. 11 is brought into a selected state, and the low evaluation screen 450 is displayed on the display unit 25. In other words, in a case where a time for which the user has browsed the document units 410 configuring the document 400 does not satisfy a threshold set in advance, evaluations lower than a case where the threshold set in advance is satisfied are reflected in the document units 410.

Next, the evaluation request unit 112 determines, based on browsing information, whether or not there are candidates of the other document units 410 related to the next one document unit 410 (S607).

In a case where there are candidates of the other document units 410 related to the next one document unit 410 (Yes in S607), processing proceeds to Step S602, and the process is repeated.

In a case where there are no candidates of the other document units 410 related to the next one document unit 410 in Step S607 (No in S607), the evaluation request unit

112 makes an evaluation request related to the identified other document units 410 (S608), and terminates the process.

Although the high evaluation screen 430 and the low evaluation screen 450 are generated based on browsing and evaluation information by one user in the example described above, the invention is not limited thereto. In order to display on the display unit 25 of the client terminal 20 of the one user, the high evaluation screen 430 and the low evaluation screen 450 may be generated based on browsing and evaluation information by another user different from the one user. In addition, evaluation information on the document units 410 by the one user is shared with the other user.

In addition, although evaluation information is shared between users in the example described above, the invention is not limited thereto. Evaluation information by the user is shared with the manager who manages the document 400. In addition, based on evaluation information managed for each document unit 410, the manager may be notified of semantic mass of the document unit 410 browsed by the user, among the documents 400.

Further, although the high evaluation screen 430 and the low evaluation screen 450 are displayed on the display unit 25 of the client terminal 20 in order to receive evaluations on the plurality of document units 410 in the example described above, the invention is not limited thereto. Results of evaluations may be automatically given without requesting the user to evaluate the other document units 410 related to the one document unit 410. Accordingly, a burden of evaluations on the other document units 410 on the user who has evaluated the one document unit 410 is reduced.

In addition, although a configuration where evaluations on the plurality of document units 410 configuring the document 400 consisting of a hierarchical structure are received has been adopted in the example described above, the invention is not limited thereto. The configuration is also applicable to a structured document that does not have a hierarchical structure including chapters, clauses, and sections. For example, the configuration is also applicable to a case where individual evaluation targets are arranged in parallel without having a hierarchy.

Figure 12:
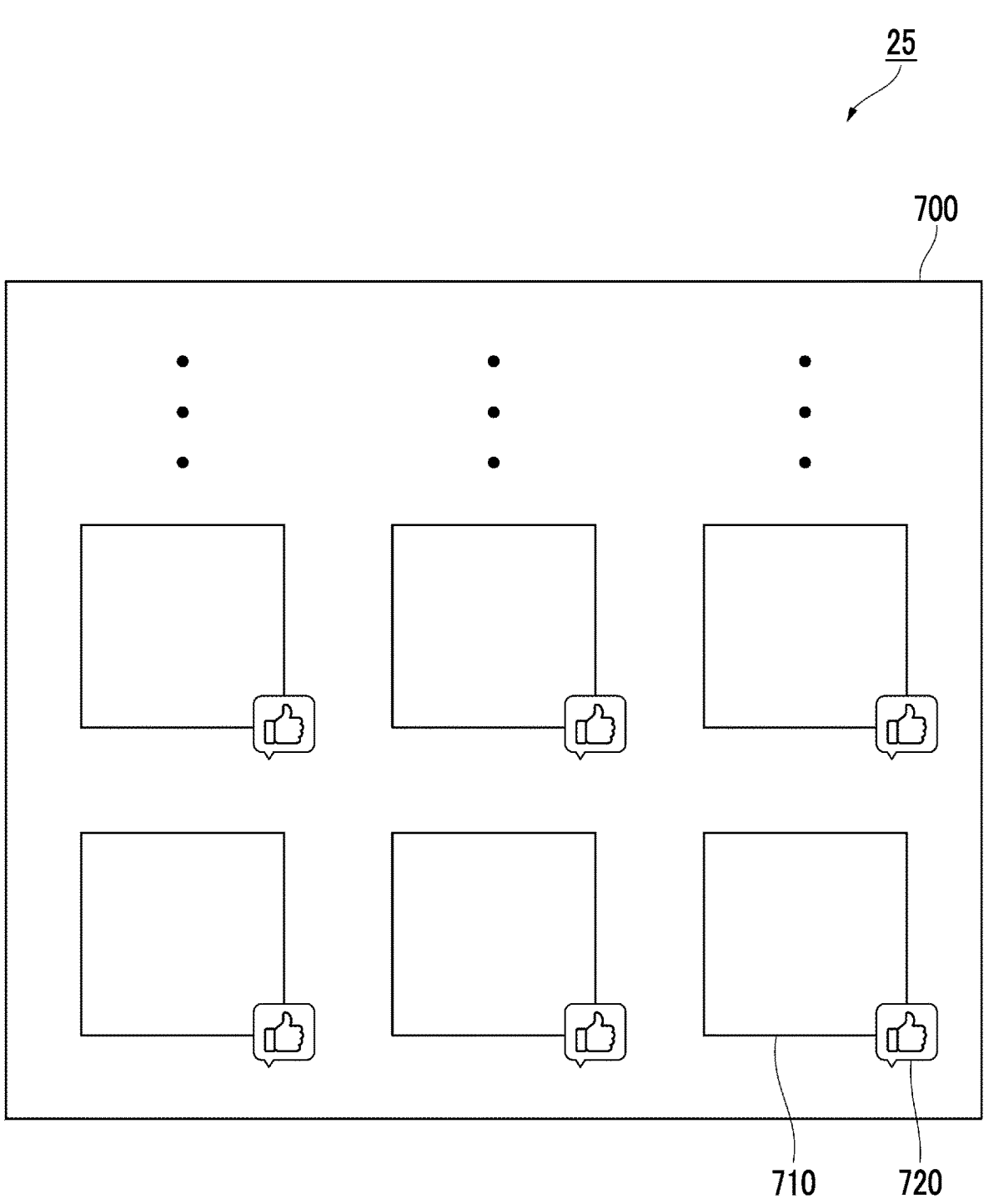
FIG. 12 is a view showing an example of another document to which the present exemplary embodiment is applied.

FIG. 12 is a view showing an example of a document 700 to which the present exemplary embodiment is applied.

The display unit 25 of the client terminal 20 according to the present exemplary embodiment displays the document 700 including a plurality of contents 710 and high evaluation button images 720 each of which receives an instruction of a high evaluation on each content 710, as shown in FIG. 12.

The document 700 is an example of the aggregate of the plurality of evaluation targets, and is an electronic document configured by a relationship between the parallel contents 710.

The content 710 is an example of the evaluation target, and is an individually independent unit configuring the document 700 held by the management server 10. Relevance between one content 710 and another content 710 does not matter. In a case where the one content 710 is designated, the one content 710 may be enlarged and displayed, or a separate screen indicating information related to the one content 710 may be displayed.

The high evaluation button image 720 is an example of the evaluation button image, and receives an instruction in which the user gives an evaluation to each content 710. Instead of the high evaluation button image 720, an evaluation button image that receives an instruction related to a low evaluation may be displayed.

In a case where one high evaluation button image 720 is selected after the user has browsed the plurality of contents 710, a result of an evaluation is automatically given, based on a browsing history of each content 710, to another content 710 different from the content 710 corresponding to the one high evaluation button image 720.

In the present exemplary embodiment, the arithmetic processing units 11 and 21 are provided with the programs executed by the CPUs 11a (see FIG. 2) and 21a (see FIG. 4), which are examples of the processor, in a state of being stored in a computer-readable recording medium such as a magnetic recording medium (a magnetic tape and a magnetic disk), an optical recording medium (optical disk), an optical magnetic recording medium, and a semiconductor memory. In addition, the programs executed by the CPUs 11a and 21a may be downloaded to the management server 10 and the client terminal 20, using communication means, such as the Internet.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The process performed by the information processing system 1 in the present exemplary embodiment is prepared as, for example, a program such as application software. The program can be provided not only by communication means but also by storing the program in a recording medium such as a CD-ROM.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system comprising:
a client terminal; and
a server, comprising a processor configured to:
   receive an evaluation on one evaluation target in an aggregate of evaluation targets, to which results of evaluations are to be individually given, from the client terminal, wherein the aggregate of evaluation targets is a structured document including a plurality of document units;
   in a case where another evaluation target different from the one evaluation target in the aggregate of evaluation targets satisfies a condition set in advance, determine that the another evaluation target is related to the one evaluation target; and
   give a result of the evaluation to the another evaluation target.

2. The information processing system according to claim 1,
   wherein the another evaluation target is an evaluation target browsed by the client terminal until the one evaluation target is evaluated, and
   wherein the result of the evaluation is automatically given to the another evaluation target.

3. The information processing system according to claim 2,
   wherein the result of the evaluation is given based on a time for which the client terminal has browsed the another evaluation target.

4. The information processing system according to claim 1,
   wherein an evaluation screen that collectively receives evaluations on the another evaluation target based on an operation by the client terminal is displayed in a case where the one evaluation target is evaluated.

5. The information processing system according to claim 1,
   wherein the another evaluation target to which the result of the evaluation is given is aggregated together with the evaluation on the one evaluation target.

6. The information processing system according to claim 1,
   wherein each of the plurality of evaluation targets is respectively a different document unit among the plurality of document units.

7. The information processing system according to claim 1,
   wherein a result of the evaluation given to the one evaluation target is selected from one of a higher-level evaluation and a lower-level evaluation in response to a selection operation performed by the client terminal.

8. The information processing system according to claim 1,
   wherein each of the results of evaluations is respectively presented as a button image.

9. An information processing system comprising:
a client terminal; and
a server, comprising a processor configured to:
   receive an evaluation on one evaluation target in an aggregate of evaluation targets, to which results of evaluations are to be individually given, from the client terminal, wherein the aggregate of evaluation targets is a structured document including a plurality of document units; and
   display an evaluation screen which receives evaluations on a plurality of other evaluation targets different from the one evaluation target in the aggregate of evaluation targets in a case where an operation by the client terminal satisfies a condition set in advance.

10. The information processing system according to claim 9,
   wherein the evaluation screen is generated based on a configuration of the aggregate of the evaluation targets.

11. The information processing system according to claim 10,
   wherein a result of an evaluation identical to a result of an evaluation on a higher-level evaluation target is given to a lower-level evaluation target linked to the higher-level evaluation target in a case where the configuration of the aggregate of the evaluation targets has a hierarchical structure.

12. The information processing system according to claim 9, wherein the evaluation screen is generated based on a browsing history in which the client terminal has browsed the aggregate of the evaluation targets.

13. The information processing system according to claim 12, wherein the evaluation screen is generated based on an order in which the client terminal has browsed another evaluation target configuring the aggregate of the evaluation targets.

14. The information processing system according to claim 12, wherein in a case where a time for which the client terminal has browsed another evaluation target configuring the aggregate of the evaluation targets does not satisfy the threshold set in advance, the evaluation screen does not receive an evaluation on the another evaluation target or reflects an evaluation lower than an evaluation on an evaluation target satisfying a threshold set in advance in the another evaluation target.

15. The information processing system according to claim 9, wherein the evaluation screen receives an evaluation related to a link in a case where an evaluation target, which is a link destination, is evaluated.

16. The information processing system according to claim 15, wherein the evaluation related to the link includes an evaluation on an evaluation target, which is a link source.

17. The information processing system according to claim 16, wherein the evaluation related to the link includes an evaluation on a relationship between the evaluation target, which is the link destination, and the evaluation target, which is the link source.

18. The information processing system according to claim 17, wherein in a case where the evaluation target, which is the link destination, and the evaluation target, which is the link source, have an identical result of an evaluation, the identical result of the evaluation is given to the relationship between the evaluation target, which is the link destination, and the evaluation target, which is the link source.

19. The information processing system according to claim 9, wherein in a case where the evaluations on the plurality of other evaluation targets are received, evaluation information, in which results of the evaluations on the plurality of other evaluation targets and an order in which the client terminal has browsed the plurality of other evaluation targets are associated with each other, is managed.

20. The information processing system according to claim 19, wherein the evaluation information is shared with another client terminal different from the client terminal.

* * * * *